United States Patent [19]

Haserodt

[11] Patent Number: 6,031,836
[45] Date of Patent: Feb. 29, 2000

[54] WEB-PAGE INTERFACE TO TELEPHONY FEATURES

[75] Inventor: Kurt H. Haserodt, Westminster, Colo.

[73] Assignee: Lucent Technologies Inc., Murray Hill, N.J.

[21] Appl. No.: 08/710,220

[22] Filed: Sep. 13, 1996

[51] Int. Cl.[7] .......................... H04M 11/00; H04M 3/42; H04L 12/28; G06F 15/163

[52] U.S. Cl. ..................... 370/389; 370/401; 370/404; 370/427; 379/90.01; 379/93.01; 379/210; 709/217; 709/223

[58] Field of Search ................................ 370/352, 353, 370/380, 389, 392, 396, 401, 404, 427, 435, 450, 465, 485; 379/90.01, 93.01, 93.05, 93.09, 100.15, 100.16, 201, 210; 709/217, 223, 230

[56] References Cited

U.S. PATENT DOCUMENTS

| | | | |
|---|---|---|---|
| 5,327,486 | 7/1994 | Wolff et al. | 379/96 |
| 5,530,852 | 6/1996 | Meske, Jr. et al. | 395/600 |
| 5,550,906 | 8/1996 | Chau et al. | 379/207 |
| 5,568,540 | 10/1996 | Greco et al. | 379/89 |
| 5,572,643 | 11/1996 | Judson | 395/793 |
| 5,608,446 | 3/1997 | Carr et al. | 348/6 |
| 5,608,786 | 3/1997 | Gordon | 379/100 |
| 5,712,901 | 1/1998 | Meermans | 379/88 |
| 5,742,670 | 4/1998 | Bennett | 379/142 |
| 5,764,736 | 6/1998 | Shachar et al. | 379/93.09 |
| 5,790,548 | 8/1998 | Sistanizadeh et al. | 370/401 |
| 5,805,587 | 9/1998 | Norris et al. | 370/352 |

OTHER PUBLICATIONS

Low, C., *The Internet Telephony Red Herring*, HP Laboratories Technical Report, May 15, 1996, pp. 1–15.

Muller, N., *Dial 1–800–Internet*, Byte, vol. 21, No. 2, Feb. 1, 1996, XP 000566097, pp. 83–84, 86, 88.

*Communications*, IEEE Spectrum, vol. 33, No. 1, Jan. 1, 1996, pp. 30–41.

"Netspeak's Hot Internet Sun Product", *Computer Telephony*, vol. 5, Issue 8 (Aug. 1996), pp. 120–124.

"Internet Hop Off", *Computer Telephony*, vol. 4, Issue 3 (Mar. 1996), pp. 10–12.

*Primary Examiner*—Fan S. Tsang
*Assistant Examiner*—Allan Hoosain
*Attorney, Agent, or Firm*—David Volejnicek

[57] ABSTRACT

A method is provided for clients to access server-based telephony features in the Internet or other non-telephony client-server network, in a platform-independent and network-independent fashion and without modification of the clients. A user of a client (101) uses the client's World Wide Web (WWW) browser (113) to download from a WWW server (104) a page (115) that defines a blank feature form that has virtual actuators and associated parameters fields for the telephony features. The user marks up the downloaded page via the WWW browser to indicate feature selection and any feature parameters, and uploads the marked up page to the WWW server. A form-interpreting script (116) executed by the WWW server interprets the marked up page, and the WWW server sends a feature request that corresponds to the user's feature selection and user-specified parameters to a telephony feature server (105). The telephony feature server responds to the request by providing the requested feature to the user's client. If needed, the WWW server also requests the client to establish a TCP/IP connection with the telephony feature server.

10 Claims, 2 Drawing Sheets

WEB-PAGE INTERFACE TO TELEPHONY FEATURES

TECHNICAL FIELD

This invention relates to communication systems, including telephone systems and the Internet.

BACKGROUND OF THE INVENTION

It is known in the communications arts that voice calls can be carried by the Internet (or some other data transport network) between a pair of Internet phones or voice-enabled computers. It is also known that voice calls carried by the Internet can be interfaced by a gateway to the telephone network so that an Internet phone or a voice-enabled computer connected to the Internet can engage in a voice call with a standard telephone connected to the telephone network. Illustrative examples of such capabilities are disclosed in "Netspeak's Hot Internet Sun Product", *Computer Telephony*, Vol. 5, Issue 8 (August 1996), pp. 120–124, and in "Internet Hop Off", *Computer Telephony*, Vol. 4, Issue 3 (March 1996), pp. 10–11. It is further known that telephony features can be provided to computers or terminals on a local area network (or some other data transport network) via a feature server. An illustrative example of such capability is disclosed in U.S. Pat. No. 5,550,906. Telephony features are features that are provided to telephones and telephone calls by modern telecommunications switching systems, such as the Lucent Technologies Inc. Definity® private branch exchange. They may include, by way of example and without limitation, features such as call redirection (e.g., call forwarding, call coverage), multiple call appearances (e.g., hold, drop, transfer, conference), call center agent features (e.g., agent login, agent logout, after-work mode, etc.), call center management information features (e.g., maximum time in queue, queue length, skill-based split staffing levels, etc.), and calling party information features (e.g., position in queue, advertising-on-hold, etc.). Providing a Web-page-like interface for system management and administration of Internet-accessible systems is also known. An example thereof may be found in the router products of the Advanced Computer Communications company.

Standards have not been developed for protocols by which computers, terminals, Internet phones, and other devices—jointly referred to as clients—can interact with feature servers over the Internet and other non-telephony communications networks in order to access telephony features. Consequently, the clients and the servers must be specifically designed and configured to work with each other, typically via a proprietary protocol that includes telephony feature access commands, and they typically are unable to work with servers or clients of a different design or configuration—other manufacturers' equipment, for example. This has the serious and unfortunate consequence that the use of feature servers is limited to "closed" networks that are controlled by a single entity—e.g., a single company's local area network—that can dictate what equipment and feature-access protocol is used on the network, and that the use of feature servers is not possible on "open" networks such as the Internet.

SUMMARY OF THE INVENTION

This invention is directed to solving these and other problems and disadvantages of the prior art. According to the invention, there is provided a way for clients to access server-based telephony features in a non-telephony client-server network, such as the Internet, in a platform-independent and network-independent fashion and without need for any modifications to the clients. Illustratively, World-Wide Web (WWW) browsers allow Internet clients to access WWW information servers over the Internet in a platform-independent and network-independent fashion, and this capability is exploited by the invention in that clients use browsers to access server-based telephony features via the Internet in a manner similar to how they conventionally access information via the WWW. As a consequence, the feature accesses are affected in a platform-independent and network-independent fashion by conventional Internet clients.

Specifically according to an aspect of the invention, a method of accessing telephony features in a non-telephony client-server network (e.g., the Internet) wherein clients and servers communicate with each other via a predefined communications protocol (e.g., the WWW) that lacks telephony feature-access commands comprises the following steps. The client requests an individual telephony feature by communicating data (e.g., a marked up feature-form page) that correspond to that feature with the server via the predefined protocol. Hence, no changes are required either to the client or to the network's protocol. The server then responds to the communicated data by requesting a provider of the telephony features to provide the individual telephony feature to the client, and the provider does so. The server thus does for the client what the client was not able to do itself. Hence, the capability to access telephony features is easily implementable in and retrofittable into conventional networks, such as the Internet, without modification of either the Internet or its communication protocol, or the clients.

Specifically according to another aspect of the invention, a method of accessing telephony features over the Internet by using the World Wide Web (WWW) comprises the following steps. A WWW browser of a client requests a WWW page that defines a telephony feature form from a WWW server via the Internet. The WWW server responds by providing the requested WWW page to the client via the Internet. The WWW browser indicates selection of an individual telephony feature by marking up the telephony feature form of the received WWW page, and the client sends the marked up WWW page via the Internet to an interpreter (e.g., to the WWW server). The interpreter interprets the marked up telephony feature form to determine the selected individual telephony feature. In response to the determination, a provider of the telephony features then provides the selected individual telephony feature. Thus, the conventional WWW and WWW browsers are used without modification to access telephony features via the Internet These and other features and advantages of the invention will become more apparent from the following description of an illustrative embodiment of the invention taken together with the drawing.

DETAILED DESCRIPTION

Figure 1:
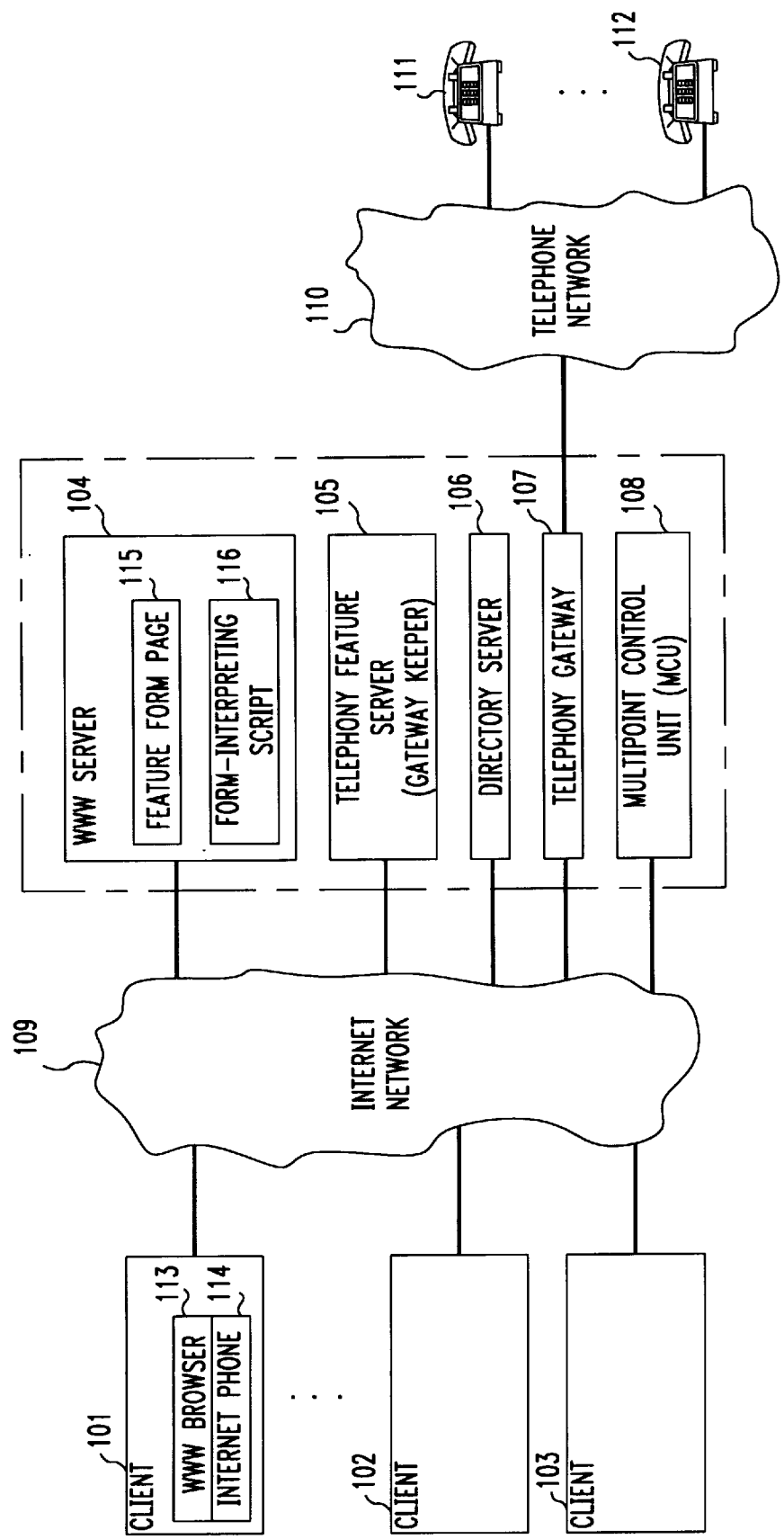
FIG. 1 is a block diagram of a communications network that implements an illustrative embodiment of the invention.

FIG. 1 shows a combined data-and-telephony communications network. The non-telephony portion of the communications network of FIG. 1 comprises a plurality of clients 101–103 and servers 104–106 interconnected by the Internet network 109, and a multipoint control unit (MCU) 108 for providing multipoint connections (conference calls, for example). The telephony portion of the communications network of FIG. 1 comprises a plurality of telephones 111–112 interconnected by a telephone network 110, and a telephony gateway 107 that interconnects the Internet network 109 with telephone network 110.

Servers 104–106 include a World-Wide Web (WWW) server 104. The World-Wide Web is a de-facto standard protocol for finding and transferring information on the Internet between information-requesting clients and information-sourcing servers. Information is typically transferred in data entities known as pages. The World Wide Web is based on (includes) the Transmission Control Protocol/internet Protocol (TCP/IP) for effecting communications connections over the Internet. The World Wide Web also provides a means for client interactions with pages of information, known as the hypertext mark-up language (HTML).

Servers 104–106 further include a directory server 106 which provides conventional directory services to clients 101–103, and a telephony feature server 105 which provides telephony features to clients 101–103. Telephony feature server 105 also functions as a "gateway keeper", in the parlance of the ITU H.323 protocol standard, for telephony gateway 107 which is a "gateway" in the parlance of the H.323 protocol standard. Units 104–108 may either be individual entities, or they may comprise a single entity that performs all of their functions. An illustrative such single entity is the Lucent Technologies Inc. Multi Media Communications eXchange (MMCX).

For interacting with WWW server 104 and other WWW servers (not shown) on the Internet network 109, each client 101–103 is equipped with a WWW browser 113, such as a Netscape Navigator or a Microsoft Internet Explorer. For carrying on voice communications with other clients and with telephones 111–112, each client 101–102 is equipped with an Internet phone 114, such as the Intel Iphone, or the Netscape CoolTalk or LiveMedia products.

In addition to any other pages of information that it may provide, WWW server 104 includes a feature-form page 115 and an associated form-interpreting script 116. Page 115 allows users of clients 101–102 to select and activate or deactivate telephony features and to specify and enter parameters for those features via browsers 113, and script 116 interprets the users' selections and entries.

Illustratively, page 115 presents users of clients 101–102 with a plurality of virtual (graphical-display) actuators each corresponding to, and labeled with, a corresponding feature, and for each feature that has user-specifiable parameters, provides one or more fill-in-the blank fields in which the users can enter desired parameter values (e.g., telephone numbers).

Figure 2:
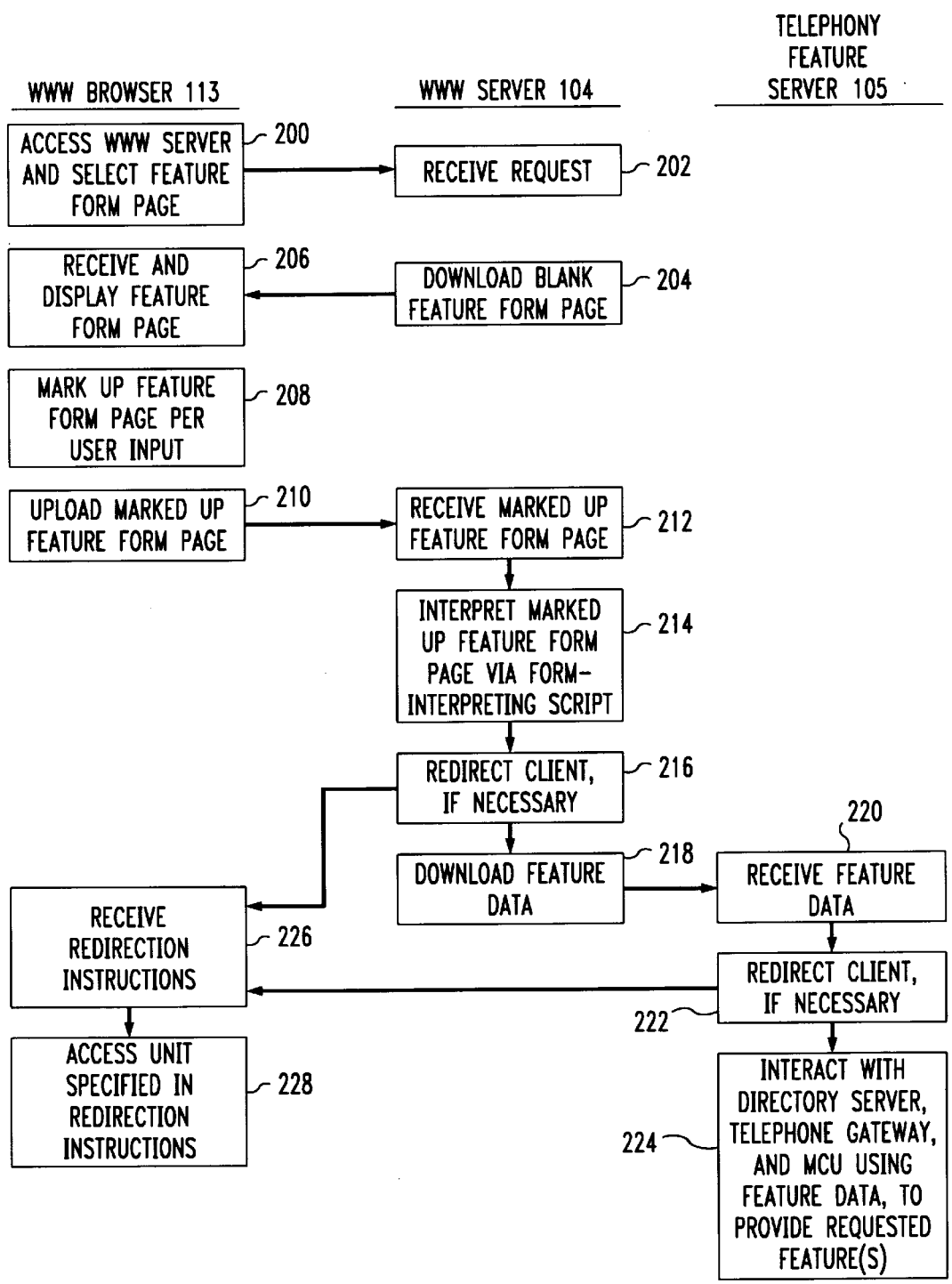
FIG. 2 is a diagram of operations of units of the communications network of FIG. 1 that implement the illustrative embodiment of the invention.

The use that is made of page 115 by clients 101–103 to access telephony features is flowcharted in FIG. 2. To access page 115, a user of a client 101 uses browser 113 to access server 104 and select page 115 in a conventional WWW manner, at step 200. Server 104 receives the request, at step 202, and in response conventionally downloads page 115 to client 101, at step 204. The downloaded page 115 carries a blank feature form—one on which features are not selected and parameters are not filled out. Browser 113 receives page 115, and presents (displays) page 115 to the user via a display of client 101, at step 206, again in a conventional manner. The user then uses browser 113 to mark up the feature form: the user selects individual features and fills in parameter values on the feature form of page 115, at step 208. When the user is finished, browser 113 uploads the marked up page 115 back to server 104, at step 210, again in a conventional WWW manner.

Server 104 receives the marked up page 115, at step 212, and in response executes form-interpreting script 116 to interpret the marked up page 115, i.e., to determine from the feature form which features the user selected, whether the user selected to activate or deactivate selected features, and what parameters the user has specified for selected features, at step 214. Based on this determination, server 104 may find that client 101 may need to be connected to server 105. In that case, server 104 communicates in the conventional Internet manner (using the TCP/IP protocol) with client 101 to cause it to redirect its connection to server 105, at step 216. Client 101 responds to any received redirection instructions from server 104, at step 226, by terminating its connection to server 104 and establishing a new connection to server 105, at step 228, again conventionally (by using the TCP/IP protocol). Server 104 then downloads the data that it derived from marked up page 115 to telephone feature server 105 as a feature access request, at step 218. If necessary, server 105 responds to receipt of this request, at step 220, by again redirecting the data (but not the control) portion of the connection of client 101 to another entity, such as gateway 107 or MCU 108, at step 222. Server 105 also interacts with server 106, gateway 107, and MCU 108 and uses the received data in the interactions in a conventional manner to effect the feature and parameter selections made by the user, at step 224. Client 101 responds to any received redirection instructions from server 105, at step 226, by terminating its data (media) connection to server 105 and establishing a new data connection to the entity indicated by the redirection instructions, at step 228. However, client 101 maintains its control connection to server 105, whereby server 105 can send conventional Internet network 109 commands to client 101.

Some specific examples of features are given below to illustrate the general procedure described above.

To place a telephone call to a telephone 111, user of client 101 uses browser 113 to click on a "telephone call" feature virtual button of downloaded feature form page 115, and fills in the telephone number of telephone 111 in a corresponding field. Upon receipt of the marked up page 115, server 104 responds to the user's selection of a telephone call by sending directions to client 101 to connect to telephony feature server 105, and sends a telephone call request along with an identifier of client 101 and the called telephone number to server 105. When client 101 accesses server 105 through Internet network 109, server 105 correlates client 101 with the telephone call request and sends directions to client 101 to access telephony gateway 107. Server 105 also sends an identifier of client 101 and the called telephone number to gateway 107. In response, gateway 107 establishes a call to telephone 111 through telephone network 110, and when client 101 accesses gateway 107 through Internet network 109, gateway 107 correlates client 101 with the telephone call and interfaces the Internet connection with the telephone call.

To place a conference call to a plurality of other clients 102–103 and/or telephones 111–112, user of client 101 uses browser 113 to click on a "conference call" feature virtual button of downloaded page 115 and fills in the universal resource locator (URL, an Internet address) or "handle" (an Internet identifier) of each called client 102–103 and/or the telephone number of each called telephone 111–112 in corresponding fields. Upon receipt of marked up page 115, server 104 responds to the user's selection of a conference call by sending directions to client 101 to connect to telephony feature server 105, and sends a conference call request along with an identifier of client 101 and the called telephone numbers, URLs, and/or handles to server 105. When client 101 accesses server 105 through Internet network 109, server 105 correlates client 101 with the conference call request, sends any received URLs and/or handles to directory server 106 for translation into presently-corresponding URLs, and sends a conference identifier and any called telephone numbers to gateway 107. In response, server 106 returns the presently-corresponding URLs, and gateway 107 establishes calls to called telephones 111–112 through telephone network 110. Server 105 also sends directions to client 101 to connect to MCU 108, sends the identifier of client 101 and the presently-corresponding URLs of called clients 102–103 along with the conference identifier to MCU 108, and sends directions to MCU 108 to access gateway 107 with the conference identifier. When client 101 accesses MCU 108 through Internet network 109, MCU 108 accesses gateway 107 through Internet network 109 and provides the conference identifier to gateway 107. In response, gateway 107 interfaces the telephone calls to telephones 111–112 with the Internet connection to MCU 108. MCU 108 also establishes connections to called clients 102–103 through the Internet network 109, and conferences together the Internet connections to called clients 102–103, client 101, and telephone gateway 107.

To activate redirection of incoming calls to another destination (e.g., another client 102), user of client 101 uses browser 113 to click on a "redirection on" feature virtual button of downloaded page 115 and fills in one or more URLs or handles of one or more clients 102 in a corresponding field. Upon receipt of the marked up page 115, server 104 responds to the user's selection by sending a redirection activation request along with the received URLs or handles to server 105. Server 105 responds by sending the received URLs or handles to directory server 106 for translation into presently-corresponding URLs. When server 106 returns the presently-corresponding URLs, server 105 sends then back to directory server 106 with instructions to store them as a sequence of presently-corresponding URLs for the URL of client 101. Thereafter, any Internet or telephone calls placed by any client 102–103 or telephone 111–112 to client 101 will be redirected by directory server 106 to the presently-corresponding URLs in sequence until one of them accepts the call or the sequence is exhausted, in a conventional manner.

To deactivate redirection of incoming calls, user of client 101 uses browser 113 to click on a "redirection off" feature virtual button of downloaded page 115. Upon receipt of the marked up page 115, server 104 responds by sending a redirection deactivation request along with the URL of client 101 to server 105. Server 105 responds by sending the URL of client 101 to directory server 106 with instructions to store it as the presently-corresponding URL for client 101. Thereafter, any Internet or telephone calls placed by any client 102–103 or telephone 111–112 to client 101 will be directed by directory server 106 to client 101, in a conventional manner.

To transfer an Internet call between client 101 and client 102 from client 101 to client 103, user of client 101 uses browser 113 to download page 115, and to click on a "transfer" feature virtual button of downloaded page 115 and fill in the URL or handle of clients 102 and 103 in corresponding fields. Upon receipt of the marked up page 115, server 104 responds to the user's selection by sending a transfer request along with the received URLs or handles of clients 102 and 103 to server 105. Server 105 responds by sending the received URL or handle of client 103 to directory server 106 for translation into a presently-corresponding URL. When directory-server 106 returns the presently-corresponding URL, server 105 sends this URL of client 103 to client 102 along with instructions to connect to this URL. Client 102 responds by breaking the Internet network 109 connection to client 101 and establishing a new Internet network 109 connection to client 103, in a conventional manner.

Of course, various changes and modifications to the illustrative embodiment described above may be envisioned. For example, given the examples of telephony features described above, it would be evident to one skilled in the art how to implement other telephony features in the communications system of FIG. 1. Or, the marked-up feature form page can be returned by a client to an entity other than WWW server 104—to telephony feature server 105, for example—in which case the form-interpreting script would be executed by that entity. Also, instead of receiving a feature form page from a WWW server, each client's browser may be permanently equipped with an "applet" (e.g., a Java application running on the client's browser) that presents the client's user with a user interface for selecting features and parameters (e.g., a feature form) and then communicates the user's selections, in Java or otherwise (instead of a marked up HTML document page), to a server. Such changes and modifications can be made without departing from the spirit and the scope of the invention and without diminishing its attendant advantages. It is therefore intended that such changes and modifications be covered by the following claims.

The invention claimed is:

1. A method of accessing telephony features in a non-telephony client-server network wherein clients and servers communicate with each other via a predefined communications protocol that lacks telephony feature-access commands, comprising the steps of:

the client requesting an individual telephony feature by communicating corresponding data with the server via the predefined protocol;

the server responding to the communicated data by requesting a provider of the telephony features to provide the individual telephony feature to the client;

the server further responding to the communicated data by requesting the client to connect to the provider;

in response to the request to connect to the provider, the client effecting a data and control communications connection with the provider;

in response to the request from the server to provide the individual telephony feature, the provider providing the individual telephony feature to the client, including the provider instructing the client to redirect a data portion of the data and control communications connection from the provider to a communications entity and to maintain a control portion of the data and control communications connection connected to the provider so that the provider can exert control over the client while the client communicates with the entity, and in response to the instruction, the client establishing a communications connection to the communications entity.

2. The method of claim 1 in a non-telephony client-server network comprising the Internet, and having the World Wide Web as the predefined communications protocol, wherein:

the step of the client requesting by communicating comprises the steps of the client requesting a feature-form page from the server, in response to receipt of the feature-form page from the server, the client marking-up the feature form page to indicate selection of the individual feature and any parameters for the selected feature, and the client sending the marked-up feature form page to the server; and the step of the server responding by requesting a provider comprises the steps of in response to the client request for a feature-form page, sending the feature form page to the client, in response to receiving the marked-up feature form page from the client, interpreting the marked up feature form page to determine the individual feature and said any parameters, and in response to the determination, requesting the provider to provide the individual feature using said any parameters.

3. The method of claim 2 wherein:

the step of the server further responding by requesting the client comprises the step of in response to the determination, the server requesting the client, via a TCP/IP protocol over the Internet, to connect to the provider; and the step of the client effecting a data and control communications connection comprises the step of in response to the request to connect to the provider, the client effecting the data and control communications connection with the provider via the TCP/IP protocol over the Internet.

4. The method of claim 1 in a non-telephony client-server network comprising the Internet, wherein:

the step of the client requesting by communicating comprises the steps of obtaining from a user of the client a selection of the individual telephony feature and any parameters for the selected feature, by executing an application program on the client; and in response to the obtaining, the executing application program causing the client to communicate data indicative of the selected telephony feature and any parameters for the selected feature to the server via the predefined protocol over the Internet.

5. The method of claim 4 wherein:

the step of the server further responding by requesting the client comprises the step of in response to the communicated data, the server requesting the client, via a TCP/IP protocol over the Internet, to connect to the provider; and the step of the client effecting a data and control communications connection comprises the step of in response to the request to connect to the provider, the client effecting the data and control communications connection with the provider via the TCP/IP protocol over the Internet.

6. A method of accessing telephony features over the Internet by using the World Wide Web (WW, comprising the steps of:

a WWW browser of a client requesting a WWW page that defines a telephony feature form from a WWW server via the Internet;

in response to the request, the WWW server providing the requested WWW page to the client via the Internet;

in response to receipt of the requested WWW page, the WWW browser indicating selection of an individual telephony feature by marking up the telephony feature form of the received WWW page;

the client sending the marked up WWW page to an interpreter via the Internet;

in response to receipt by the interpreter of the marked up WWW page, the interpreter interpreting the marked up telephony feature form to determine the selected individual telephony feature;

in response to the determination, requesting a provider of the telephony features to provide the selected individual telephony feature;

further in response to the determination, requesting the client, via a TCP/IP protocol over the Internet, to connect to the provider;

in response to the request to connect to the provider, the client effecting a data and control communications connection with the provider via the TCP/IP protocol over the Internet;

in response to the request to provide the selected individual telephony feature, the provider providing the selected individual telephony feature, including the provider instructing the client to redirect a data portion of the data and control communications connection from the provider to a communications entity and to maintain a control portion of the data and control communications connection connected to the provider, so that the provider can exert control over the client while the client communicates with the entity, and in response to the instruction, the client establishing a data communications connection to the communications entity.

7. An apparatus that enables telephony features to be accessed in a non-telephony client-server network wherein clients and servers communicate with each other via a predefined communications protocol that lacks telephony feature-access commands, and wherein a provider of the telephony features responds to requests for features by providing the requested features, the apparatus comprising:

a server connectable to the network for communicating with a client via the predefined protocol to obtain data corresponding to an individual telephony feature requested by the client, the server being responsive to the obtained data, for requesting the client to effect a data and control communications connection with the provider and for requesting the provider to provide the individual telephony feature to the client; and the provider, responsive to the request to provide the individual telephony feature, for causing the client to redirect a data portion of the data and control communications connection from the provider to a communications entity and to maintain a control portion of the data and control communications connection connected to the provider, so that the provider can exert control over the client while the client communicates with the entity.

8. The server of claim 7 for a non-telephony client-server network that comprises the Internet and that has the World Wide Web as the predefined communications protocol, wherein:

the server includes a feature form page, means responsive to receipt from a client of a request for the feature form page, for sending the feature form page to the client, means responsive to receipt from the client of the feature form page marked up by the client to indicate selection of the individual feature and any parameters for the selected feature, for interpreting the marked up feature form page to determine the individual feature and said any parameters, and means responsive to the determination by requesting the provider to provide the individual feature using any said parameters.

9. The server of claim 8 wherein:

the requesting means responds to the determination by requesting the client, via a TCP/IP protocol over the Internet, to effect a TCP/IP connection with the provider over the Internet.

10. An apparatus that enables telephony features to be accessed by clients over the Internet by using the World Wide Web (WWW), from a provider of the telephony features that responds to requests for features by providing the requested features, the apparatus comprising:

a WWW server that includes a first arrangement responsive to a request for a WWW page that defines a telephony feature form, received from a client via the Internet using the WWW, for providing the requested WWW page to the client via the Internet using the WWW, an interpreter responsive to receipt, from the client via the Internet using the WWW, of the WWW page now defining the telephony feature form marked up by the client to indicate selection of an individual telephony feature, for interpreting the marked up telephony feature form to determine the selected individual telephony feature, and a second arrangement responsive to the determination, for requesting the provider of the telephony features to provide the selected individual telephony feature and for requesting the client, via a TCP/IP protocol over the Internet, to effect a TCP/IP data and control communications connection with the provider over the Internet; and the provider, responsive to the request to provide the individual telephony feature, for causing the client to redirect a data portion of the data and control communications connection from the provider to a communications entity and to maintain a control portion of the data and control communications connection connected to the provider, so that the provider can exert control over the client while the client communicates with the entity.

* * * * *